(12) United States Patent
Fenn

(10) Patent No.: US 6,518,388 B1
(45) Date of Patent: Feb. 11, 2003

(54) COATING COMPOSITION

(75) Inventor: David Robert Fenn, Burnham (GB)

(73) Assignee: PPG Industries Ohio, Inc., Cleveland, OH (US)

( * ) Notice: Subject to any disclaimer, the term of this patent is extended or adjusted under 35 U.S.C. 154(b) by 0 days.

(21) Appl. No.: 09/868,804

(22) PCT Filed: Dec. 23, 1999

(86) PCT No.: PCT/GB99/04423

§ 371 (c)(1),
(2), (4) Date: Jun. 21, 2001

(87) PCT Pub. No.: WO00/39186

PCT Pub. Date: Jul. 6, 2000

(30) Foreign Application Priority Data

Dec. 24, 1998 (GB) ............................................. 98284466

(51) Int. Cl.⁷ ............................................... C08G 18/42
(52) U.S. Cl. .............................. 528/45; 528/73; 528/75; 528/288; 528/392; 525/123; 525/440; 525/453; 427/384; 428/423.1
(58) Field of Search ............................. 528/45, 73, 288, 528/392, 75; 525/440, 123, 453; 427/384; 428/423.1

(56) References Cited

U.S. PATENT DOCUMENTS

| 5,142,015 A | 8/1992 | Meixner et al. ............... 528/49 |
| 5,173,560 A | 12/1992 | Gras et al. ..................... 528/45 |
| 5,212,216 A | 5/1993 | Hattori et al. ............... 523/415 |
| 5,523,376 A | 6/1996 | Hicks et al. ................... 528/44 |
| 5,814,689 A | 9/1998 | Goldstein et al. ............. 524/86 |

FOREIGN PATENT DOCUMENTS

| EP | 0424745 | 5/1991 |
| GB | 1409496 | 10/1975 |

*Primary Examiner*—Rachel Gorr
(74) *Attorney, Agent, or Firm*—Jacques B. Miles

(57) ABSTRACT

A coating composition comprising; i) a polymer having uretdione groups, and ii) a polyamine crosslinker.

16 Claims, No Drawings

COATING COMPOSITION

REFERENCE TO RELATED APPLICATIONS

This patent application claims priority of GB 9828446.6 filed on Dec. 24, 1998, which was also filed as PCT International Application No. PCT/GB99/04423 on Dec. 23, 1999, designating the United States of America.

FIELD OF THE INVENTION

This invention relates to coating compositions, their preparation and use.

BACKGROUND

Coatings used for the original painting of motor vehicles and for their repair are required to have very good physical properties such as hardness and resistance to water and solvents. The coating compositions are also required to have good application and appearance properties so that they are easy to apply to a substrate using spray application and result in final films having good gloss.

One class of coating compositions which is known for use in painting motor vehicles comprises a hydroxyl functional polymer, such as a polyester or acrylic polymer, and a polyisocyanate. These two components react together after application to the substrate to form a polyurethane coating. These compositions are often thus referred to as 'polyurethane coating compositions' although strictly the polyurethane is only formed when the coating hardens.

These polyurethane coating compositions have been widely used in the vehicle refinish industry for many years but suffer from the disadvantage that polyisocyanates are known respiratory sensitisers and so considerable care must be taken in their use, particularly to prevent inhalation of the paint spray by the operator during spraying. This usually requires the operator to wear an air-fed breathing mask. Clearly, an alternative type of paint is desirable.

We have now discovered a surprising alternative class of coating compositions which can give application and final film properties which are equal to or better than those of polyurethane coatings. These alternative coating compositions comprise a polymer incorporating uretdione groups and acrylate, maleic or fumaric groups, which polymer of cross linked with a polyamine cross linker. This represents a total departure from the last 25 years of developments in refinish coating compositions which have virtually all focused on polyurethane compositions.

GB-1409496 and U.S. Pat. No. 5,814,689 disclose uretdione containing polyurethanes cross linked with polyamines. There is however no reference to the use of polyesters or mixed polyesters having acrylate, maleic or fumaric groups.

EP-424745 discloses a maleic or fumaric containing polyurethane polyester for UV of four radical core. There is however no mention of amine cross-linking.

SUMMARY OF THE INVENTION

According to the present invention there is provided a coating composition comprising:
i) a polymer having uretdione groups, and
ii) a polyamine cross linker,
said polymer being a polyester, or a mixed polyester-polyurethane, which polyester or mixed polyester-polyurethane has other groups capable of reacting with the polyamine cross linker, which other groups are acrylate, maleic or fumaric groups.

DETAILED DESCRIPTION OF THE INVENTION

The uretdione groups can be pendant, but preferably they are in the polymer backbone. The polymer is preferably a polyester.

Suitable polyesters are derived from a polybasic acid, a polyhydroxy compound and a compound having uretdione groups and reactive groups.

Polybasic acids are compounds having two or more carboxylic acid groups. Such polybasic acids are well known in the polyester art. Examples of suitable polybasic acids are $C_{1-6}$ alkane dioic acids such as succinic acid, glutaric acid, adipic acid or hexanedioic acid, cycloaliphatic acids such as hexahydrophthalic acid, unsaturated alkane dioic acids such as fumaric or maleic acids, dimer acids, and aromatic acids such as phthalic acid, isophthalic acid and trimellitic acid. Ester-forming derivatives of such acids can also be used in place of the free acids. Ester-forming derivatives include anhydrides and lower alkyl, for example methyl or ethyl, esters. Mixtures of two or more acids or their ester-forming derivatives can be used.

The polyester may have other amine-reactive groups capable of, reacting with the polyamine crosslinker such as acetoacetate or epoxy. More preferably, the polyester has units of formula (I);

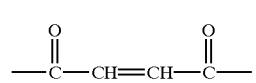

Formula (I)

in which the carbonyl groups can be cis or trans. These units also react with amine groups on the polyamine crosslinker and provide additional sites for crosslinking of the polyester. These units can be derived from maleic acid or fumaric acid, or from ester-forming derivatives of these acids such as maleic anhydride and the lower alkyl, for example methyl or ethyl, esters of these acids. Preferably, these units are derived from maleic acid or maleic anhydride.

Preferably at least 25% of the groups on the polymer which will react with the polyisocyanate crosslinker are uretdione groups.

Polyhydroxy compounds are compounds having two or more hydroxyl groups and are well known in the polyester art Examples of suitable polyhydroxy compounds are diols such as ethylene glycol, propylene glycol, 1,3-propane diol, butylene glycol, 1,4-butane diol, 1,6-hexane diol, neopentyl glycol, triols such as trimethylol propane, and glycerol, tetrols such as pentaeryatritol and higher polyols such as sorbitol. Mixtures of two or more of these polyols can be used.

Uretdione groups are groups of formula (I)I;

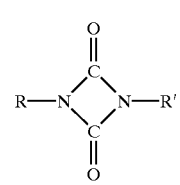

Formula (II)

in which R and R' are the residues of the polyester polymer backbone.

These uretdione groups can be incorporated into the polyester backbone by use of a compound having uretdione groups and also reactive groups which will react with the other components of the polyester so as to become incorporated into the polyester backbone. Examples of reactive groups are hydroxyl groups, acid groups, epoxy groups, and isocyanate groups. One example of a compound having uretdione groups and reactive groups is the uretdione of a diisocyanate, such as hexamethylene diisocyanate uretdione (available as HD100™ which also comprises a proportion of higher adducts, from Arco) of Formula (III);

Formula (III)

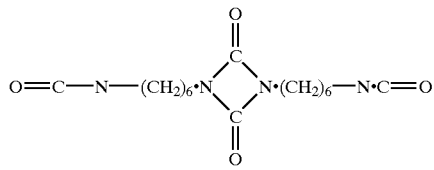

In this case the reactive groups are isocyanate groups which will react with hydroxyl groups on the polyols and so become incorporated into the backbone of the polyester.

Mixed polyester-polyurethanes can be made in a similar way to polyeters but using a di- or polyisocyanate instead of some of the polybasic acid. Suitable diisocyanates are tetramethylxylene diisocyanate, hexamethylene diisocyanate, isophorone diisocyanate and toluene diisocyanate. Suitable polyisocyanates include the isocyanurate trimers, allophanates and uretdiones of diisocyanates such as those described above as well as the reaction products of these diisocyanates with polyols. Polyols are compounds having two or more hydroxyl groups. Suitable polyols include trimethylol propane, glycerol and pentaeryatritol. Many such polyisocyanates are commercially available, for example under the Desmodur trade mark from Bayer or the Tolonate trade mark from Rhodia.

Preferably the polyester has 0.5 to 4 mols/kg uretdione groups based on the weight of the polyester. Preferably the polyester has a number average molecular weight of 600 to 4000, more preferably 600 to 2000.

The polyamnine is a compound with two or more amine groups per molecule, preferably 2 to 6. Preferred diamines, having two amine groups, are aliphatic and cycloaliphatic diamines. Examples of suitable aliphatic and cycloaliphatic diamines are ethylene diamine, propylene diamine, 1,6-hexanediamine and cycloaliphatic diamines of the formulas;

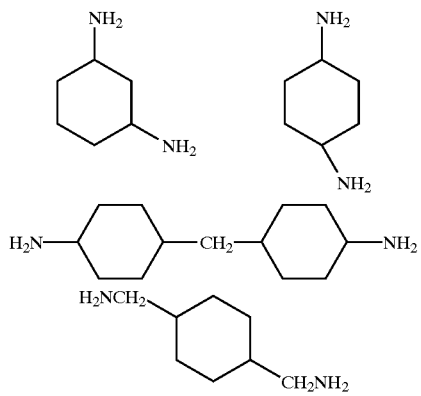

Also useful are polyamines containing three or more primary amine groups. Examples of such polyamines include tris-(2-aminoethyl) amine, $N(CH_2CH_2NH_2)_3$ and the products of the Jeffamine™ series manufactured by Jefferson Chemical Company having the general structure

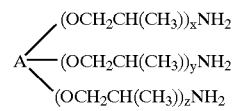

where A is the residue of an aliphatic triol, such as glycerol or trimethylol propane, and x, y and z are integers, the sum of which is between 5 and 85. Suitable compounds containing three or more amine groups can be made by joining together compounds with fewer amine groups. For example diethylene triamine can be converted to its bis diketimiine by reaction with methyl diisobutyl ketone and then the remaining secondary amine group can be reacted with a diisocyanate or a diepoxide to give a polyamine having four amine groups or with a triisocyanate to give a polyiamine having six amine groups. Diamines can be reacted with triisocyanates to give triamines. Diamines can be reacted with a maleate ester such as dimethyl maleate to give a triamine.

The amine groups can be free amine groups but preferably the amine groups are blocked primary amine groups. Examples of blocked primary amine groups are aldimines and ketimine groups.

Aldimines or ketimine groups are groups of formula (IV)

Formula (IV)

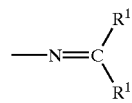

in which $R^1$ and $R^2$ are independently H, alkyl, cycloaliphatic or substituted alkyl, aryl or cycloaliphatic group.

Preferred ketimines and aldimines are obtained by reaction of a polyamine with an aldehyde or ketone. Examples of aldehydes and ketones suitable for use in making the aldimines and ketimines are those containing 1 to 8 carbon atoms such as propionaldehyde, butyraldehyde, isobutyraldehyde, acetone, methyl ethyl ketone, methyl isobutyl ketone, diisopropyl ketone, cyclopentanone and cyclohexanone.

One particularly preferred aldimine is Desmophen TPLS 2142™ from Bayer and one particularly preferred ketimine is VPLS 2965™ from Bayer.

The components are preferably used such that the ratio of the amine groups on the polyamine to the number of amine-reactive groups in the polyester is in the range 0.7:1 to 3:1, more preferably 0.9:1 to 1.5:1.

The polyester, or polyester-polyurethane can be made by conventional means. Generally the components of the polyester are melted together or dissolved in a suitable solvent, such as xylene. The melt or solution is then heated so as to remove the water produced in the reaction between the acid and the hydroxyl groups. When the components are melted together, the water can conveniently be removed using a fractionating column at temperatures of between 150 and 250° C. When the components are dissolved in a solvent the water can conveniently be removed by azeotropic distillation using a Dean and Stark apparatus at the reflux temperature of the solvent A combination of these method can be used, initially melting the components together and removing water using a fractionating column and then adding solvent and removing filter water using a Dean & Stark apparatus. If a polyisocyanate is to be included, either to introduce the uretdione groups or to produce a polyurethane or polyester-polyurethane, then this is generally added after reaction of the other components, and at a lower temperature, such as between 50 and 100° C. because the isocyanate groups are much more reactive than acid or ester groups. Preferably a catalyst for the isocyanate-hydroxyl reaction is included such as a tin catalyst, for example dibutyl tin dilaurate.

Preferably the compositions also comprise a volatile organic solvent. The volatile organic solvent can be any solvent which will dissolve the polyisocyanate and the hydroxyl functional polymer. It can be an aliphatic or aromatic hydrocarbon such as Solvesso 100™, toluene or xylene, an alcohol such as butanol or isopropanol, an ester such as butyl acetate or ethyl acetate, a ketone such as acetone, methyl isobutyl ketone or methyl ethyl ketone, an ether, an ether-alcohol or an ether-ester or a mixture of any of these The compositions can also contain other conventional paint additives such as, pigments, fillers, UV absorbers and flow aids.

The compositions can be made by mixing the components. When the composition comprises an organic solvent, the compositions can be made by dissolving the components in the organic solvent in any order. The composition is preferably made by adding the polyamine to the other components shortly before use. This avoids problems with the potlife of these compositions.

The coating composition of the invention can be applied to the surface of a substrate and then allowed or caused to dry and cure. According to the present invention there is provided a process for coating a substrate which comprises the steps of applying a layer of a coating composition according to the present invention to a surface of the substrate and thereafter causing or allowing the layer to cure.

The coating composition can be applied by conventional means such as by brush, roller or spray, preferably spray. The substrate can be for example, metal, plastic, wood or glass and can be a previously painted surface. The compositions are particularly useful for refinishing motor vehicles and especially as primers.

The applied layer can be allowed to cure at ambient temperature in the case where the hydroxyl polymer and crosslinker react together at ambient temperatures. Alternatively the layer can be baked at elevated temperatures, for example 50–120° C. to accelerate curing. Drying and curing typically takes between 5 minutes and 24 hours depending on the ambient conditions and on the particular components used. Conveniently it takes about 15 minutes to about 5 hours.

According to the present invention there is also provided a coated article obtainable by the process.

The invention will now be illustrated by means of the following examples.

1. Polyesters 1–3 Containing Uretdione Groups

Stage 1

The components listed in Table 1 were heated with stirring under a nitrogen atmosphere until the mixture began to exotherm (at about 90° C.) when heating was stopped. The temperature of the mixture rose to about 140° C. due to the exotherm. When the exotherm was over and the temperature began to fall, heating was resumed and the temperature was raised to 205° C. As the temperature was raised, water was removed via a fractionating column. When the mixture was at 205° C. and the evolution of water had slowed, the mixture was allowed to cool.

Stage 2

The fractionating column was replaced with a Dean & Stark column filled with xylene. Xylene (27 g) was added to the mixture and the temperature was raised to reflux to remove further water. When the acid value of the mixture reached 20–25 mgKOH/g non vol the heat was removed.

Stage 3

In the case of Polyester 1, the temperature was reduced to 60° C., the amount of butyl acetate given in table 1 was added and the mixture stirred to give a homogeneous solution. In the case of Polyesters 2 & 3, the temperature was reduced to 60° C. and the amounts of HD 100 (hexamethylene diisocyanate uretdione, from Arco) and butyl acetate shown in Table 1 were added. The mixture was stirred at 60° C. until no isocyanate groups could be detected in the mixture by infra-red spectroscopy.

TABLE 1

|  | Polyester 1 | Polyester 2 | Polyester 3 |
| --- | --- | --- | --- |
| Stage 1 |  |  |  |
| neopentyl glycol | 237.51 | 259.2 | 300.3 |
| trimethylol propane | 21.42 | 23.4 | 27.1 |
| maleic anhydride | 230.53 | 201.3 | 145.8 |
| Stage 3 |  |  |  |
| HD 100 | 0 | 192.7 | 559.4 |
| Butyl Acetate | 273.1 | 407.5 | 646 |

The resulting polyesters all contained about the same number of groups per average polymer chain reactive with the amine groups on the polyamine crosslinker. In polyester 1 all of the reactive groups are derived from maleic anhydride, in polyester 2, 80% of the reactive groups are derived from maleic anhydride and 20% are uretdione groups and in polyester 3, 50% of the reactive groups are derived from maleic anhydride and 50% are uretdione groups. The functionalities of the polymers are described in Table 9.

2. Coating Compositions

The polyesters from section 1 above were mixed with a ketimine (VPLS 2965 from Bayer) in the amounts shown in Table 2 below. The components were mixed at a constant ratio of amine groups on the ketimine to the total of uretdione groups and maleic groups on the polymer.

TABLE 2

|  | Composition 1 | Composition 2 | Composition 3 |
| --- | --- | --- | --- |
| Polyester 1 | 20 | — | — |
| Polyester 2 | — | 20 | — |
| Polyester 3 | — | — | 20 |
| VPLS 2965 | 10.5 | 8 | 5.9 |
| Butyl acetate | 7 | 5.3 | 3.9 |

Testing

The compositions were spread onto glass using a 200 micron block spreader. The films were baked at 60° C. for 30 minutes. The hardness of the films was measured using a Konig hardness tester after 1 hour and after 3 days. The results are given in Table 3.

TABLE 3

|  | Composition 1 | Composition 2 | Composition 3 |
| --- | --- | --- | --- |
| 1 Hour | Tacky | 10 | 13 |
| 3 Days | 143 | 99 | 69 |

These results show the improved early hardness obtained by including uretdione groups in the polymer.

3. Polyester 4 Containing Uretdione Groups

Stage 1

Neopentyl glycol (628.0 g) and maleic anhydride (447.3 g) were heated with stirring under a nitrogen atmosphere until the mixture began to exotherm (at about 130° C.) when heating was stopped. The temperature of the mixture rose to about 160° C. due to the exotherm. When the exotherm was over and the temperature began to fall, heating was resumed and the temperature was raised to 205° C. As the temperature was raised, water was removed via a fractionating column. When the mixture was at 205° C. and the evolution of water had slowed, the mixture was allowed to cool.

Stage 2

The fractionating column was replaced with a Dean & Stark column filled with xylene. Xylene (80 g) was added to the mixture and the temperature was raised to reflux to remove further water. When the acid value of the mixture reached 20–25 mgKOH/g non vol. the heat was removed.

Stage 3

The temperature was reduced to 60° C. and HD 100 (428.2 g) and butyl acetate (892.0 g) were added. The mixture was stirred at 60° C. until no isocyanate groups could be detected in the mixture by infra-red spectroscopy. The functionality of the polymer is summarised in table 9.

4. Coating Compositions

Polyesters from section 1 and 3 above were mixed with a ketimine (VPLS 2965 from Bayer) in the amounts shown in Table 4 below. The components were mixed at a constant ratio of amine groups.on the ketimine to the total of uretdione groups and maleic groups on the polymer.

TABLE 4

|  | Composition 4 | Composition 5 |
| --- | --- | --- |
| Polyester 1 | 80 | — |
| Polyester 4 | — | 80 |
| VPLS 2965 | 42 | 32 |
| Butyl acetate | 34.3 | 34.1 |

Testing

The compositions were spread onto glass using a 200 micron block spreader. The films were left to cure at room temperature. The dust free time (DFT) of each system was determined by dropping dust on to the panel at five-minute intervals. The DFT was the time after application when the dust could be removed using a small brush without marking the coating. The hardness of the films was measured using a Konig hardness tester after 1 day and after 1 week. A solvent spot test was carried out by placing a drop of methyl ethyl ketone on the coating at various periods after application. After ten minutes the drop was removed using a soft cloth and any damage to the film was recorded. The results are given in Table 5.

TABLE 5

|  | Composition 4 | Composition 5 |
| --- | --- | --- |
| DFT (minutes) | 35 | 25 |
| Konig hardness |  |  |
| 1 day | 16 | 16 |
| 1 week | 51 | 53 |
| Solvent spot test |  |  |
| 1 day | film dissolved | film dissolved |
| 1 week | film dissolved | slight mark |

These results show the improved dust free time and solvent resistance obtained by including uretdione groups in the polymer.

5. Preparation of a Ketimine 1

Stage 1

Diethylenetriamine (308.5 g) and methyl isobutyl ketone (MiBK, 799.1 g) were added to a flask equipped with a stirrer, nitrogen inlet and a Dean and Stark condenser filled with MIBK. The mixture was raised to reflux and reflux was continued until 107.7 g of water had been collected.

Stage 2

The temperature was reduced to 60° C. and HDT LV (isocyanaurate trimer of hexamethylene triisocyanate available from Rhodia, 545.6 g) was added slowly over about 90 minutes. The temperature was maintained between 60 and 100° C. Once the addition was complete, the temperature was held at 100° C. for a 30 minutes.

6. Coating Compositions

Polyesters from section 1 and 3 above were mixed with a ketimine 1 in the amounts shown in Table 6 below. The components were mixed at a constant ratio of amine groups on the ketimine to the total of uretdione groups and maleic groups on the polymer.

TABLE 6

|  | Composition 6 | Composition 7 |
| --- | --- | --- |
| Polyester 1 | 80 | — |
| Polyester 4 | — | 80 |
| Ketimine 1 | 58.4 | 42.8 |
| Methyl isobutyl ketone | 58.6 | 51.9 |

Testing

The compositions were spread onto glass using a 200 micron block spreader. The films were left to cure at room temperature. Separate glass panels were also cured for 30 minutes at 60° C. The dust free time (DFT) of each system was determined by dropping dust on to the panel at five-minute intervals. The DFT was the time after application when the dust could be removed using a small brush without marking the coating. The print free time (PFT) was determined by placing a I" disc of Whatmann No. 1 filter paper on the drying panel under a I" rubber bung and a 50 g weight. The filter paper is held in place for exactly sixty seconds and the weight and bung are then removed. The panel is then lifted and inverted. The PFT was the first time when the filter paper falls off without leaving a mark on the coating. A solvent spot test was carried out by placing a drop of methyl ethyl ketone on the coating at various periods after application. After ten minutes the drop was removed using a soft cloth and any damage to the film was recorded. The results are given in Table 7.

TABLE 7

|  | Composition 6 | Composition 7 |
| --- | --- | --- |
| Room temperature cure |  |  |
| DFT (minutes) | 20 | 15 |
| PTF (minutes) | 110 | 70 |
| Solvent spot test |  |  |
| 2 days | Film dissolved | No effect |
| 1 month | No effect | No effect |
| 60° C. cure |  |  |

TABLE 7-continued

|  | Composition 6 | Composition 7 |
|---|---|---|
| Solvent spot test |  |  |
| 2 days | Film dissolved | No effect |
| 1 month | No effect | No effect |

These results show the improved dust free time, print free time and solvent resistance obtained by including uretdione groups in the polymer

7. Polyester 5 Containing Uretdione Groups

Stage 1

Neopentyl glycol (376.1 g) and maleic anhydride (236.05 g) were heated with stirring under a nitrogen atmosphere until the mixture began to exotherm (at about 80° C.) when heating was stopped. The temperature of the mixture rose to about 130° C. due to the exotherm. When the exotherm was over and the temperature began to fall, heating was resumed and the temperature was raised to 205° C. As the temperature was raised, water was removed via a fractionating column. When the mixture was at 205° C. and the evolution of water had slowed, the mixture was allowed to cool.

Stage 2

The fractionating column was replaced with a Dean & Stark column filled with xylene. Xylene (40 g) was added to the mixture and the temperature was raised to reflux to remove further water. When the acid value of the mixture reached 30 mgKOH/g non vol. the heat was removed.

Stage 3

The temperature was reduced to 60° C. and HD 100 (387.9 g) and butyl acetate (575.4 g) were added. The mixture was stirred at 60° C. until no isocyanate groups could be detected in the mixture by infra-red spectroscopy. The functionality of the polymer is summarised in table 9.

8. Coating Compositions

An automotive refinish primer composition of the present invention was prepared from the following ingredients

TABLE 8

| Ingredients | Weight |
|---|---|
| Grind paste |  |
| Polyester 4 | 354.6 |
| Butyl acetate | 129.8 |
| Xylene | 35.6 |
| Methyl propoxol acetate | 14.9 |
| Silica extender | 13.9 |
| China clay | 104.0 |
| Talc | 104.0 |
| Calcium magnesium carbonate | 213.9 |
| Barytes | 294.8 |
| Titanium dioxide |  |
| Let down |  |
| Polyester 4 | 90.0 |
| Methyl propoxol acetate | 57.0 |
| Butyl acetate | 84.9 |

The grind paste was prepared by combining all of the ingredients in a suitable vessel under high-speed agitation using a Cowles blade. Agitation was continued at high speed until a fineness of grind of 20–25 microns was achieved. Next the let down was mixed with the grind paste under agitation.

The primer composition was tested by spray applying the primer to cold rolled steel test panels, topcoating with a colourcoat and then evaluating the test panels for cross hatch adhesion and appearance. Two test panels were sanded with P180 sandpaper and solvent wiped with white spirit. The panels were the coated with 20–25 microns of chromate free etch primer P565–713 (available from ICI Autocolor, used as instructed on the product data sheet). Five parts by volume of the above primer were then mixed with one part by volume of ketimine 1 and one part by volume of methyl isoamyl ketone. The activated primer was spray applied to one of the panels to give a film build of 100–1.20 microns. The other panel was coated with Hi Build Filler Surfacer P565–888 (available from ICI Autocolor, used as instructed on the product data sheet). Both panels were baked at 60° C. for thirty minutes and the sanded with P360 sandpaper. Both panels flatted easily. 100 parts by weight of Aquabase medium coarse aluminium basic P968–9987 was mixed with 10.3 parts by weight of Aquabase activator P935–2018 and 3 parts by weight of Aquabase thinner P275–366 (all available from ICI Autocolor). This was applied to both panels to give a film build of 12–15 microns. Both panels were then coated with P190–670 clearcoat (available from ICI Autocolor, used as instructed on the product data sheet). Both panels had excellent appearance and there was no discernible deterioration in appearance over one month. Crosshatch adhesion was measured according to ASTM D3359 one day and one month after application. Both panels gave 100% adhesion.

TABLE 9

| | | Functionality | Functionality distribution (% by moles) | |
|---|---|---|---|---|
| Resin | Solids content (/%) | (/mol/kg solids) | 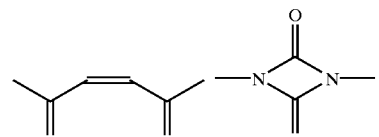 | |
| Polyester 1 | 60 | 5.2 | 100 | 0 |
| Polyester 2 | 60 | 4.0 | 80 | 20 |
| Polyester 3 | 60 | 3.0 | 50 | 50 |
| Polyester 4 | 60 | 4.0 | 80 | 20 |
| Polyester 5 | 60 | 3.7 | 67 | 33 |

What is claimed is:

1. A coating composition comprising:
   i) a polymer having uretdione groups; and
   ii) a polyamine crosslinker,
   said polymer being a polyester, or a mixed polyester-polyurethane, which polyester or mixed polyester-polyurethane has other groups capable of reacting with the polyamine crosslinker, which other groups are acrylate, maleic or fumaric groups.

2. A composition as claimed in claim 1 in which the polymer also has groups of formula (I);

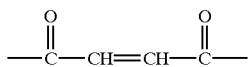

Formula (I)

3. A composition as claimed in claim 2 in which the groups of formula 1 are derived from maleic acid or maleic anhydride.

4. A composition as claimed in claim 1 in which the uretdione groups are in the polymer backbone.

5. A composition as claimed in claim 4 in which the uretdione groups are derived from a compound which is the uretdione of a diisocyanate.

6. A composition as claimed in claim 5 in which the diisocyanate is hexamethylene diisocyanate.

7. A composition as claimed in claim 1 in which the polyester has 0.5 to 4 mols/kg uretdione groups based on the weight of the polyester.

8. A composition as claimed in claim 1 in which the polyester has a number average molecular weight of 600 to 4000.

9. A composition as claimed in claim 1 in which the polyamine has 2 to 6 amine groups.

10. A composition as claimed in claim 1 in which the polyamine has blocked amine groups.

11. A composition as claimed in claim 10, in which the polyamine is a ketimine.

12. A composition as claimed in claim 1 in which the ratio of the amine groups on the polyamine to the number of amine reactive groups in the polyester is in the range of 0.7:1 to 3:1.

13. A process for preparing a coating composition comprising the steps of mixing
   i) a polymer having uretdione groups, and
   ii) a polyamine crosslinker,
   said polymer being a polyester, or a mixed polyester-polyurethane, which polyester or mixed polyester-polyurethane has other groups capable of reacting with the polyamine crosslinker, which other groups are acrylate, maleic or fumaric groups.

14. A process for coating a substrate which comprises the steps of: applying a layer of a coating composition comprising:
   i) a polymer having uretdione groups, and
   ii) a polyamine crosslinker, said polymer being a polyester, or a mixed polyester-polyurethane, which polyester or mixed polyester-polyurethane has other groups capable of reacting with the polyamine crosslinker, which other groups are acrylate, maleic or fumaric groups to a surface of the substrate; and thereafter causing or allowing the layer to cure.

15. A coated substrate obtainable by the process of claim 14.

16. A composition as claimed in claim 1 in which the polyamine is an aldimine.

* * * * *